United States Patent [19]

Bremer et al.

[11] Patent Number: 5,651,833
[45] Date of Patent: Jul. 29, 1997

[54] WASTE CONCENTRATION AND DESTRUCTION PROCESS

[75] Inventors: Noel Jerome Bremer, Kent; Gary Vernon Goeden, Seven Hills; David Roy Woodbury, Bedford Heights, all of Ohio

[73] Assignee: The Standard Oil Company, Cleveland, Ohio

[21] Appl. No.: 677,480

[22] Filed: Jul. 10, 1996

Related U.S. Application Data

[62] Division of Ser. No. 388,564, Feb. 14, 1995, Pat. No. 5,562,834.

[51] Int. Cl.⁶ .................................................. B08B 3/00
[52] U.S. Cl. ..................... 134/22.15; 134/37; 423/245.3
[58] Field of Search .......................... 134/22.15, 37; 423/245.3

[56] References Cited

U.S. PATENT DOCUMENTS

| | | |
|---|---|---|
| 3,804,756 | 4/1974 | Callahan et al. . |
| 4,218,358 | 8/1980 | Armstrong et al. . |
| 4,240,808 | 12/1980 | Garber et al. . |
| 4,713,089 | 12/1987 | Robbins . |
| 5,053,581 | 10/1991 | Hildenger et al. . |
| 5,114,692 | 5/1992 | Berty ................................. 423/245.3 |
| 5,205,906 | 4/1993 | Grutsch et al. ..................... 423/245.3 |
| 5,245,113 | 9/1993 | Schulz ............................... 423/245.3 |
| 5,246,584 | 9/1993 | Donaldson et al. . |
| 5,403,798 | 4/1995 | Brendley, Jr. et al. ............ 423/245.3 |
| 5,424,045 | 6/1995 | Orman et al. ..................... 423/245.3 |
| 5,430,230 | 7/1995 | Mitsui ................................ 423/245.3 |

OTHER PUBLICATIONS

M. Antal, Jr., "Synthesis Gas Production from Organic Wastes by Pyrolysis/Steam Reforming." Dept. of Mech. and Aerospace Engineering, Princeton University.
Chem. Abstracts CA 109(22):192605q CA.
Chem. Abstracts CA 103(16): 126516m CA.
Chem. Abstracts CA 97(10): 78342k CA.
Chem. Abstracts CA 93(26): 242196f CA.
"Novel col. Internals Boost Stripping Efficiency." Chemical Engineering (Plant Notebook), Jan. 1994, p. 129.
M. Nimlos et al., "Direct Mass Spectrometric Studies of the Destruction of Hazardous Wastes. 1. Catalytic Steam Re-Forming of Chlorinated Hydrocarbons." Environ. Sci. Technol. 1992, 26, pp. 545–552.

*Primary Examiner*—Neil McCarthy
*Attorney, Agent, or Firm*—David P. Yusko; David J. Untener

[57] ABSTRACT

A process for the destruction of organic contaminants from wastewater streams and solid surfaces, including soil. The process comprises removing volatile organic compounds from the wastewater stream or surface by steam stripping and then contacting a stream comprising steam and the stripped organic compounds with a catalyst at an elevated temperature so as to convert the hydrocarbon portion of the organic compounds to a mixture of hydrogen and carbon dioxide.

11 Claims, 1 Drawing Sheet

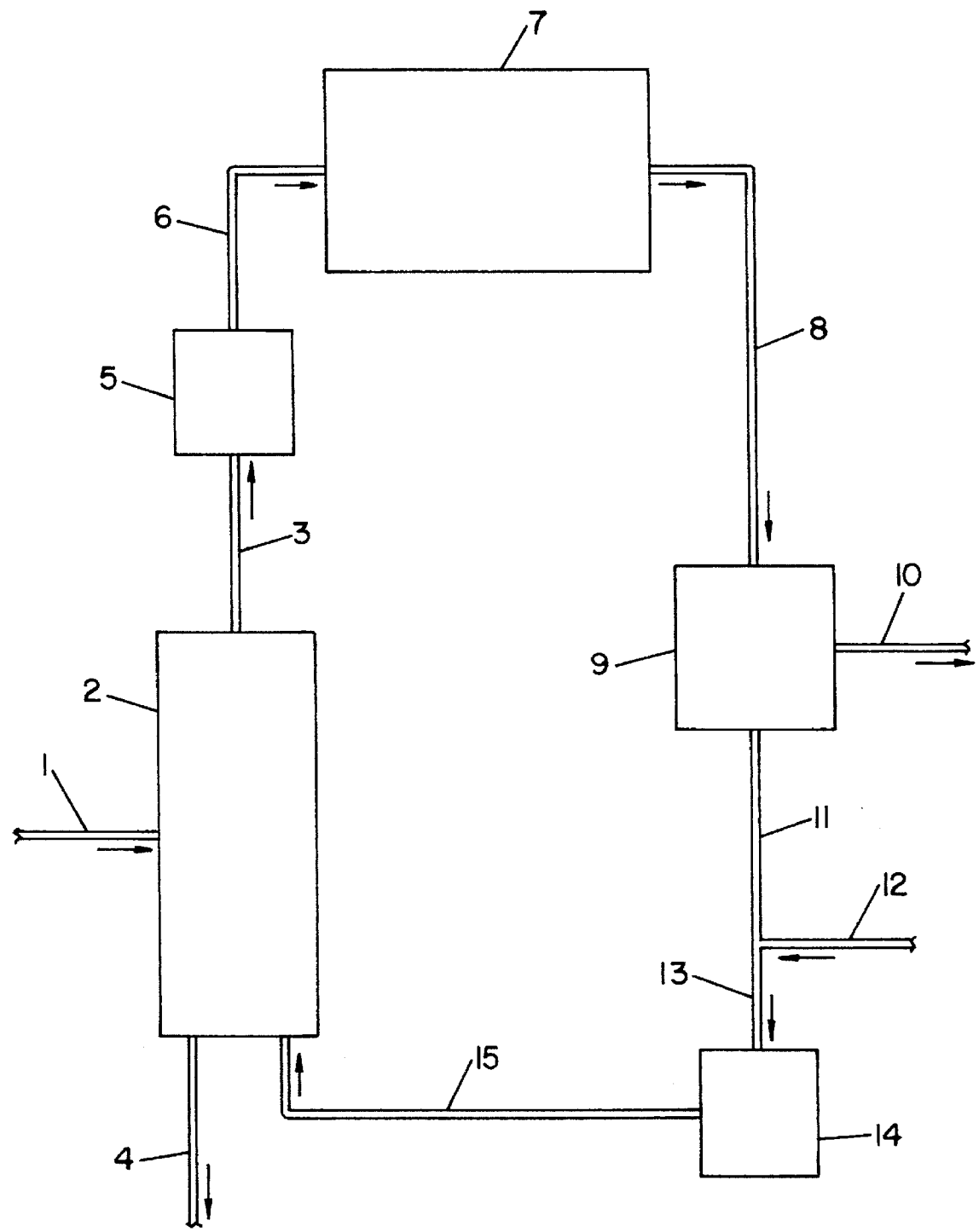
FIGURE

WASTE CONCENTRATION AND DESTRUCTION PROCESS

This is a division of application Ser. No. 08/388,564 filed Feb. 14, 1995, now U.S. Pat. No. 5,562,834.

BACKGROUND OF THE INVENTION

1. Field of the Invention

This invention relates to a process for the purification of organic compound-containing wastewater streams like those generated by the chemical processing and refining industries and the eradication of such organic compounds after their removal from the stream. More particularly, this invention relates to a process for removing organic compounds from such wastewater streams by first steam stripping the wastewater stream to reduce the concentration of the organic compounds in the aqueous stream followed by passing a stream comprising the steam and stripped organic compounds over a catalyst at an elevated temperature to convert the hydrocarbon portion of the organic compounds to a mixture comprising primarily hydrogen and carbon dioxide.

2. Description of the Prior Art

It is well known in the art to remove organic impurities from industrial wastewater or other contaminated aqueous streams by steam stripping.

In a typical steam-stripping process, contaminated water is directed into the top of a stripper column. Steam, as the vaporizing/stripping gas, enters the column near the bottom and flows upwardly. As the downwardly moving water and the upwardly moving steam contact each other, a portion of the steam condenses on the cooler feed water to heat the water to its boiling point. The remainder of steam vaporizes the hydrocarbon impurities in the wastewater and carry the impurities out of the column in the vapor phase. As the vapor phase leaves the column, it is passed through a heat exchanger to condense the vapors to a mixture of water and the organic impurities. The organic impurities are separated from the water in a decanter vessel and the organic impurities are discharged to an incinerator, a bio-treatment facility or carried to another point for further processing and recovery. The water phase, which is still saturated with dissolved organic impurities, is recycled back to the column and stripped again to remove the impurities.

The steam stripping process described above has several major drawbacks. Most significantly is the incomplete separation of the organic contaminants from the steam condensate and the additional processing of the organic contaminants before they are transformed in a material suitable for release into the environment.

A goal of the instant invention is a process for the eradication of organic constituents from industrial wastewater streams or other aqueous streams, which incorporates the separation capabilities of steam stripping with the destruction efficiency of steam reforming.

SUMMARY OF THE INVENTION

A process for the destruction of organic compounds from wastewater streams is achieved by (i) steam stripping the organic compounds from the wastewater by contacting the wastewater stream with a countercurrent flow of steam to produce a vaporous stream of steam and volatilized organic compounds and a liquid aqueous stream substantially free of organic compounds, (ii) contacting, in a reactor, the vaporous stream of steam and volatilized organic compounds with a catalyst at an elevated temperature so as to convert the hydrocarbon portion of organic compounds to a mixture comprising hydrogen gas and carbon dioxide.

(iii) cooling and separating an effluent steam from the reactor to produce a vaporous stream comprising hydrogen gas and carbon dioxide and a liquid stream comprising water.

BRIEF DESCRIPTION OF THE DRAWINGS

The Figure is a process flow diagram illustrating a preferred embodiment of the instant invention. It will be understood by those skilled in the art that, as the drawing is diagrammatic, further items of equipment such as condensers, heat exchangers, reflux drums, column reboilers, pumps, vacuum pumps, temperature sensors, pressure sensors, pressure relief valves, control valves, flow controllers, level controllers, holding tanks, storage tanks, and the like, would additionally be required in a commercial plant. The provision of such additional items of equipment forms no part of the present invention and is in accordance with conventional chemical engineering practice.

DETAILED DESCRIPTION OF THE INVENTION

The invention is a process for the destruction and eradication of the organic constituents of wastewater streams by steam stripping the organic constituents from such streams to yield a purified aqueous stream substantially free of organic wastes and then contacting the volatilized organic constituents and steam with a catalyst to convert the hydrocarbon portion of the organic constituents to a mixture comprising hydrogen and carbon dioxide, which are then separated and removed from the steam.

The chemical processing industry and petroleum refining industry generate a significant quantity of wastewater comprising organic compounds, which are suitable for treatment by the instant process. Such streams may contain hydrocarbons, such as gasoline, benzene, toluene or xylene, chlorinated solvents, such as trichloroethylene, trichloroethane, perchloroethylene, or methylene chloride, nitriles, such as acrylonitrile and methacrylonitrile, aromatics, hetero-aromatics such as pyridine, nitrogen-containing aromatics, amides, organic acids, aldehydes, alcohols and mixtures thereof. The level of organics in these streams may range as high as about 50 wt %, but are typically about 0.5 wt %.

The organic compound-containing wastewater is fed to a steam stripper. In the practice of this invention, the steam stripper may be a conventional packed tower, a tray tower of the type used for distillation or rectification, e.g. a sieve tray tower, or any device that allows countercurrent vapor/liquid separation.

The organic compound containing wastewater enters the tower near the top. Typically, the wastewater is first fed through a heat exchanger to raise the temperature of the wastewater to about 180° F. (about 82° C.) to about 200° F. (about 94° C.). Steam at a temperature of about 212° F. (about 100° C.) to about 240° F. (about 116° C.) is injected into the bottom of the tower. As the upward flowing steam contacts the downward flowing wastewater, the steam causes the organic impurities and a portion of the wastewater to vaporize. The steam, vaporized organic impurities and vaporized wastewater rise to the top of the tower.

The remaining wastewater remains in the liquid phase and flows to the bottom of the tower. The water is discharged from the tower as purified clean water substantially free of volatile organic contaminants. This purified water stream can then be passed to some reduced process of water treatment if desired. However, the discharge stream is often sufficiently pure to meet environmental standards, and further water treatment processing is not necessary.

The vaporized organic contaminants and steam removed from the top of the steam stripper are passed through a heat exchanger to raise the temperature of the stream to about 400° C. to 800° C. This stream is then fed to a reactor.

In this invention a wide range of catalyst and reactors may be used. The reactors may be fixed-bed, fluid bed, transfer line or other mode of catalytic reactor. The reactors may be a reformer-type reactor consisting of multiple catalyst-containing tubes arranged in parallel which are heated in a fixed furnace.

The operating conditions employed in the reactor (i.e. in the catalyst tubes) can vary appreciably. Any suitable conditions effective for selectively converting the hydrocarbon portion of the organic compounds contained in the wastewater stream to a mixture comprising hydrogen gas and carbon dioxide can be employed in the present invention. As used herein, the "hydrocarbon portion of the organic compounds" refers to that part of the organic compounds consisting of hydrogen and carbon atoms. Preferably, the reforming temperature will be in the range of from about 250° C. to about 1000° C., more preferably in the range from about 350° to about 800° C. The pressure can be in the range of from atmospheric to about 1,000 psig. However, higher pressures can be employed. The steam to hydrocarbon weight ratio can be in the range of from about 5:1 to about 10,000:1. The liquid space velocity can be in the range of about 0.01 to about 1,000, preferably about 1 to about 100 volumes of wastewater per volume of catalyst per hour.

In the practice of the instant invention, single or multiple reactors may be used. Multiple reactors may be arranged in parallel or in series.

Any suitable catalyst which is active for selectively converting the organic compounds found in the vaporous reformer feed stream to lower boiling materials in the presence of steam can be employed in the practice of the invention.

Typical catalyst includes (1) reduced nickel alumina-supported catalyst or (2) supported platinum group metal catalyst, both catalyst types being promoted with an alkali metal or alkaline earth metal.

The nickel catalyst used in the process is preferably a nickel-alumina catalyst containing from 5 to 90 weight percent nickel on a reduced basis and 0.5 to 10 weight percent alkali or alkaline earth metal. In this application, the values for weight percent are based on the total weight of the catalyst. Instead of alumina, other natural or synthetic silica-containing material, such as kieselguhr, silica, silica-alumina, silica-zirconia, the natural or synthetic crystalline aluminosilicates, and the like, can be used. The alkali metal or alkaline earth metal can be applied to the catalyst as the hydroxide, carbonate, or other soluble salt. Potassium carbonate is a presently preferred alkaline material.

As indicated above, the nickel component of the catalyst can be reduced and stabilized to prevent reaction with the oxygen in the air at any point subsequent to the addition of the nickel. Such reduction and stabilization permits loading the catalyst into the reactor and using it without a reduction step. However, it is within the scope of the invention to reduce the catalyst with hydrogen or other suitable reducant (e.g. carbon monoxide, light hydrocarbons) after it is in the reactor.

The platinum group metals for use in this invention can be ruthenium, rhodium, osmium, iridium, platinum, palladium, or mixtures of such metals and/or their compounds can be used.

The platinum group metals can be incorporated into any of the known natural or synthetic refractory inorganic oxide materials known as supports such as alumina, silica, magnesia, zirconia, silica-alumina, the natural or crystalline aluminosilicates, and the like. The amount of platinum group metal present in the catalyst composition can vary from 0.01 to 20 weight percent, preferably in amounts less than about 10 percent by weight. The amount of alkali metal or alkaline earth metal present in the catalyst can range from 0.5 to 10 weight percent. The alkali metal or alkaline earth metal can be applied as hydroxide, carbonate, or other soluble salt. The term "soluble" is intended to include either aqueous or non-aqueous solvents, although water is presently preferred. Potassium carbonate is the presently preferred alkali or alkaline earth compound.

Another catalyst which can be employed in the reforming step of the invention comprises a supported chromate, tungstate, or molybdate of the iron group metals, including iron, cobalt, and nickel, promoted with a barium salt of an organic acid such as barium acetate. Preferably, the support for the catalyst comprises an aluminum-containing support material such as alumina or calcium aluminate. The catalyst will ordinarily contain from 1 to 10 weight percent of the iron group metal and from 5 to 25 weight percent of the chromate, tungstate, or molybdate, calculated as the oxide. The remainder of the catalyst is comprised of support material, such as alumina or other aluminum-containing material.

The effluent stream from the reactor comprises water vapor, hydrogen gas and carbon dioxide. If nitrogen containing compounds are present in the wastewater stream, then the effluent will also contain nitrogen (primarily as $N_2$ or $NH_3$ and not $NO_x$). Similarly, if halogen containing compounds are present in the wastewater stream, then the effluent will contain hydrogen halides. The effluent stream is cooled and the gases are separated and removed from an aqueous stream in a gas/liquid separator. These off-gases can be recycled to the reactor, burned for fuel value or vented. The resulting aqueous stream, essentially free of organics, can be boiler quality feed water, which may be used for steam generation or other uses on site. In a preferred embodiment of this invention, this water is reconverted to steam and recycled to the steam stripper.

Referring now to the drawing, the Figure illustrates a preferred embodiment of the instant invention. In the Figure wastewater is fed via line 1 to the stripper column 2. Steam is fed to the stripper column via line 15. In the stripper column, water and steam flowing countercurrently contact and the volatile components in the wastewater are volatilized by the steam and removed from the stripper column with the steam via line 3. Water substantially free of volatile impurities is removed from the stripper column via line 4, and sent to further processing. The mixture of steam/volatile components removed from the stripper is fed via line 3 to a superheater 5 and then fed via line 6 to the reactor 7. In the reactor, the steam and volatilized impurities are passed over a suitable catalyst at an elevated temperature. The hydrocarbon portion of the organic impurities react to form a mixture comprising hydrogen and carbon dioxide. These reaction products and water vapor exit the reformer via line 8 and are fed to the gas/liquid separator 9. In the gas/liquid separator the reactor effluent is cooled to condense the water vapor which is removed from the separator via line 11. The reforming reaction products exit the gas/liquid separator via line 10. The water stream is fed via lines 11 and 13 to a boiler 14 for conversion into steam which is fed via line 15 to the stripper. Make-up water is added to the process via line 12.

The process described herein can be adapted and modified for other utilities. Specifically, organic compound contaminants can be removed and destroyed from any solid or porous surface, whether the surface is activated carbon, wood, plastic, metal, rock or soil (i.e. humus, clay, sand or mixtures thereof) by adapting the steam stripping portion of the process described herein. More specifically, organic compound contaminants can be removed from such surfaces by (i) contacting the surface with steam to volatilize and remove the organic compound contaminant from the surface to produce a vaporous stream comprising steam and volatilized organic compounds;

(ii) collecting the vaporous stream comprising steam and the volatilized organic compounds;

(iii) contacting at an elevated temperature, in a reactor, the vaporous stream of steam and volatilized organic compounds with a catalyst so as to convert the hydrocarbon portion of the organic compounds to a mixture comprising hydrogen gas and carbon dioxide; and (iv) cooling and separating an effluent stream from the reforming reactor to produce a vaporous stream comprising hydrogen gas and carbon dioxide and a liquid stream comprising water.

Catalyst and process parameters for the steam, the reactor, cooling and separation of reactor effluent, etc. are as previously described for the wastewater treatment process.

The above identified process can be used for many different applications. For example, removing and destroying environmentally harmful or carcinogenic organic solvents or lubricants from machinery or electrical equipment (A specific example is the removal and destruction of PCB's from electrical transformers). Another example is soil remediation, wherein steam is injected into contaminated soil to remove the organic contaminants. The mixture of steam and organic contaminants is then captured and further processed to eradicate the organic compounds as described herein.

Yet another example of the process is in regenerating activated carbon. In this application, activated carbon that has been used to adsorb organic impurites from water or wastewater is steam stripped to volatilize the adsorbed organic components and regenerate the activated carbon for further use. The mixture of steam and organic contaminants that makes up the effluent stream of the stripping operation is then fed to a catalytic reactor to eradicate the organic compounds. The steam-stripping operation may be carried out in the activated carbon adsorption column, or the activated carbon may be discharged and steam-stripped in a separate column or container.

SPECIFIC EMBODIMENTS

In order to illustrate variations of the instant invention, the following conceptual examples are provided.

EXAMPLE 1: Soil Remediation

A site composed of sandy soil is contaminated with cleaning fluids (primarily trichloro-ethylene). Injection piping is configured with retrieval tubulars to maximize areal steam penetration and organic removal and capture. As injection steam flows to producing tubulars, captured steam is routed to a header, through a superheater, and injected directly into a multitube reformer packed with ceramic rings containing a Rhodium/Platinum catalyst at about 1% loading. The preheater heats the organic/steam mix to 400° to 500° C. using heat from the reformer exit stream. The reformer is direct gas fired to maintain an exit temperature of 750° C. Chloride resistant metallurgy is used to protect against HCl in the outlet stream. After exchanging in the preheater, off-steam is condensed in a boiler feed preheater, then doused with caustic to neutralize the HCl prior to entering a gas liquid separator and discharge. Gas from the separator contains hydrogen and is routed to the reformer or boiler for fuel value.

EXAMPLE 2: Regeneration of Activated Carbon

A granular activated carbon (GAC) adsorption process is used as a final treatment for a wastewater effluent stream containing organic heterocycles. Adsorption of organics takes place in a GAC column and continues until capacity is reached and breakthrough of organics occurs, then the incoming wastewater stream is diverted to a 2nd column containing "fresh" GAC. Activated carbon in the column which reached its adsorption capacity is steam stripped in place and the gaseous effluent stream from the stripping operation (i.e. a mixture of steam and organics) is superheated and fed directly to the catalytic reactor where organics are converted to essentially $CO_2$, $H_2$, and $N_2$. After a suitble steam stripping time the GAC column is considered to be regenerated and is ready to be put back into service for fruther organic adsorption. By using this process, waste organics are effectively captured from wastewater and cleanly eradicated on-site. The "used" activated carbon, laden with hazardous waste, does not have to be shipped off-site for regeneration/incineration or disposed of in a landfill.

The foregoing embodiments of the present invention have been presented for purposes of illustration and description. This description is not intended to be exhaustive or to limit the invention to the precise form disclosed, and obviously many modifications and variations are possible in light of the above disclosure. For example, the parameters for the reforming reactor, such as temperature, pressure, size, etc., are dependent upon one another and modifications may be made to these parameters without substantially affecting the desired result. The foregoing description attempts to best explain the principle of the invention and its practical applications to thereby enable others skilled in the art to best utilize the invention in its various embodiments and with various modifications as are suited to the particular use contemplated. It is intended that the invention be defined by the following claims.

The claimed invention is:

1. A process for the removal and destruction of organic compounds from a surface comprising
   (i) contating the surface with steam to volatilize and remove the organic compounds from the surface to produce a vaporous stream comprising steam and volatilized organic compounds;
   (ii) collecting the vaporous stream comprising steam and the volatilized organic compounds;
   (iii) contacting at an elevated temperature, in a reactor, the vaporous stream of steam and volatilized organic compounds with a reduced catalyst selected from the group consisting of (1) a supported nickel catalyst, (2) a supported platinum group metal catalyst, and (3) a supported catalyst comprising an iron group metal and a compound selected from the group consisting of a chromate, tungstate and molybdate, and promoted with a barium salt of an organic acid, so as to convert the hydrocarbon portion of the organic compounds to a mixture comprising hydrogen gas and carbon dioxide, and (iv) cooling and separating an effluent stream from the reactor to produce a vaporous stream comprising hydrogen gas and carbon dioxide and a liquid stream comprising water.

2. The process of claim 1, wherein the surface is activated carbon, wood, plastic, metal, rock or soil.

3. The process of claim 1, wherein the catalyst is selected from the group consisting of (1) a supported nickel catalyst or (2) a supported platinum group metal catalyst.

4. The process of claim 3, wherein the catalyst is promoted with at least one alkali metal or alkaline earth metal.

5. The process of claim 1, wherein the reactor is selected from the group consisting of fixed-bed reactors, fluid-bed reactors, and transfer-line reactors.

6. The process of claim 1, wherein the reactor temperature is between about 250° C. and 1000° C.

7. The process of claim 1, wherein the reactor temperature is between about 350° C. and about 800° C.

8. The process of claim 1, wherein the reactor pressure is between about 1 atmosphere and about 100 psig.

9. The process of claim 1, wherein the steam to hydrocarbon weight ratio in the reactor is between about 5:1 and about 10,000:1.

10. The process of claim 1, wherein the reactor liquid space velocity is between about 0.1 and about 1,000 volumes of wastewater per volume of catalyst per hour.

11. The process of claim 10, wherein the reactor liquid space velocity is between about 1.0 and about 100 volumes of wastewater per volume of catalyst per hour.

* * * * *